(12) United States Patent  (10) Patent No.: US 9,325,216 B2
Parmeter et al.  (45) Date of Patent: Apr. 26, 2016

(54) MOTOR BEARING FOR ELECTRIC SUBMERSIBLE MOTORS

(71) Applicant: Summit ESP, LLC, Tulsa, OK (US)

(72) Inventors: Larry James Parmeter, Broken Arrow, OK (US); Brett D. Leamy, Claremore, OK (US); Randy S. Roberts, Tulsa, OK (US); Gregory Austin Davis, Broken Arrow, OK (US); John Vanderstaay Kenner, Houston, TX (US)

(73) Assignee: Summit ESP, LLC, Tulsa, OK (US)

( * ) Notice: Subject to any disclaimer, the term of this patent is extended or adjusted under 35 U.S.C. 154(b) by 0 days.

(21) Appl. No.: 14/722,852

(22) Filed: May 27, 2015

(65) Prior Publication Data

US 2015/0349603 A1 Dec. 3, 2015

Related U.S. Application Data

(60) Provisional application No. 62/005,520, filed on May 30, 2014.

(51) Int. Cl.
| | |
|---|---|
| *H02K 5/16* | (2006.01) |
| *H02K 5/132* | (2006.01) |
| *H02K 5/167* | (2006.01) |
| *E21B 43/00* | (2006.01) |
| *F04D 13/00* | (2006.01) |

(52) U.S. Cl.
CPC ............... *H02K 5/167* (2013.01); *E21B 43/00* (2013.01); *F04D 13/00* (2013.01); *H02K 5/132* (2013.01)

(58) Field of Classification Search
CPC .............................. H02K 5/132; H02K 5/167
USPC ........................................................ 310/90.5
See application file for complete search history.

(56) References Cited

U.S. PATENT DOCUMENTS

| 2,271,336 | A | * | 1/1942 | Goldsmith ................... 384/541 |
| 2,926,970 | A | | 3/1960 | Clark |
| 4,513,215 | A | | 4/1985 | Del Serra |
| 5,128,573 | A | * | 7/1992 | Liu et al. ......................... 310/87 |
| 5,765,950 | A | | 6/1998 | Eno et al. |
| 6,017,184 | A | | 1/2000 | Aguilar et al. |
| 8,277,124 | B2 | | 10/2012 | Sexton et al. |
| 2004/0057642 | A1 | | 3/2004 | New |
| 2008/0164775 | A1 | * | 7/2008 | Sesselmann .................... 310/83 |
| 2011/0140455 | A1 | * | 6/2011 | Wiggins ....................... 290/1 R |
| 2013/0278117 | A1 | | 10/2013 | Parmeter et al. |

* cited by examiner

*Primary Examiner* — Terrance Kenerly
(74) *Attorney, Agent, or Firm* — Frederic Dorwart, Lawyers; Penina Michlin Chiu

(57) ABSTRACT

A motor bearing for an electric submersible motor is described. An electric submersible motor includes a rotatable motor shaft extending longitudinally through a submersible motor, a bearing sleeve secured to the rotatable motor shaft in between two adjacent rotor sections, a motor bearing radially outward from the bearing sleeve and pressed against a stator bore, wherein the motor bearing comprises a series of magnets dispersed around an outer diameter of the motor bearing, and an insulation layer covering a surface of each magnet of the series of magnets, wherein the insulation layer faces the stator bore. A motor bearing includes a series of recessions dispersed around an outer axial surface of a motor bearing, a magnet inset in each recession of the series of recessions, and an insulation layer coating a surface of each of the magnets.

19 Claims, 3 Drawing Sheets

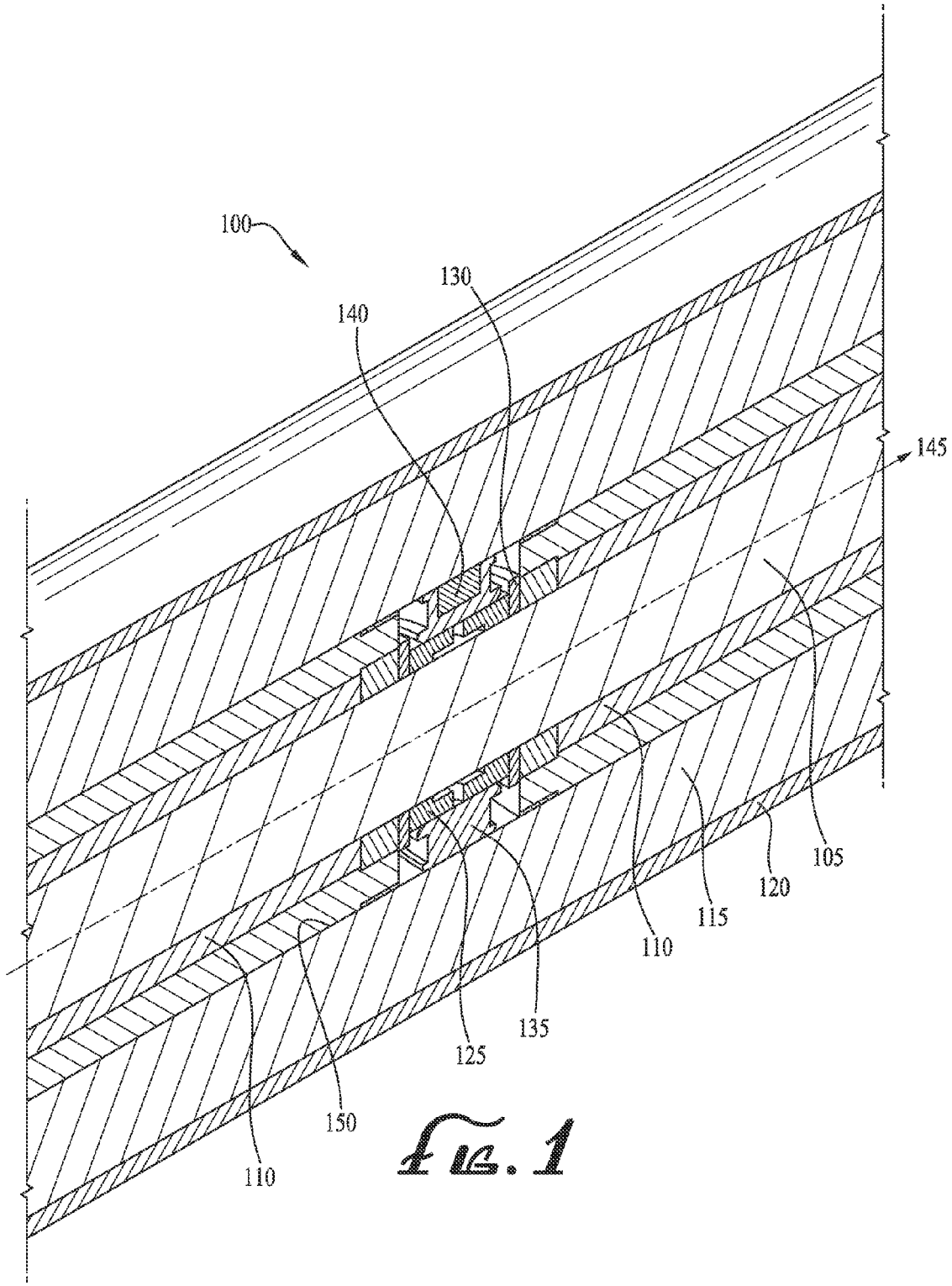

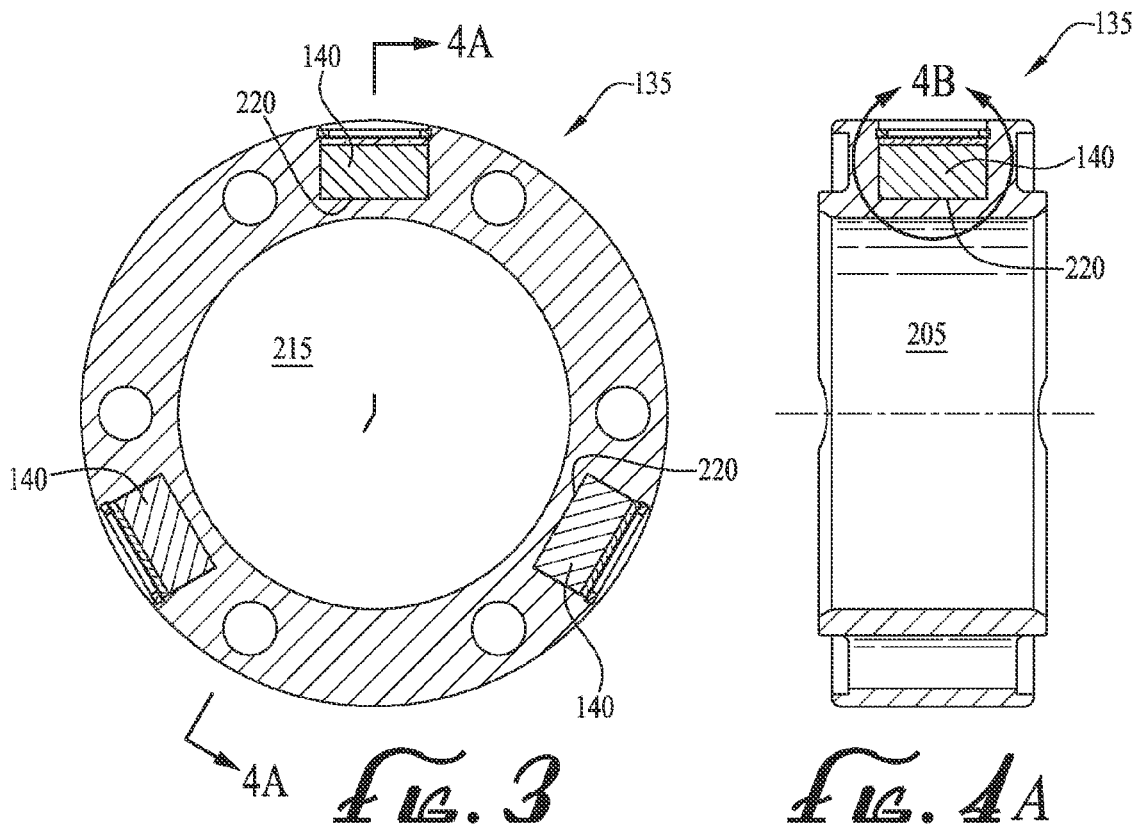
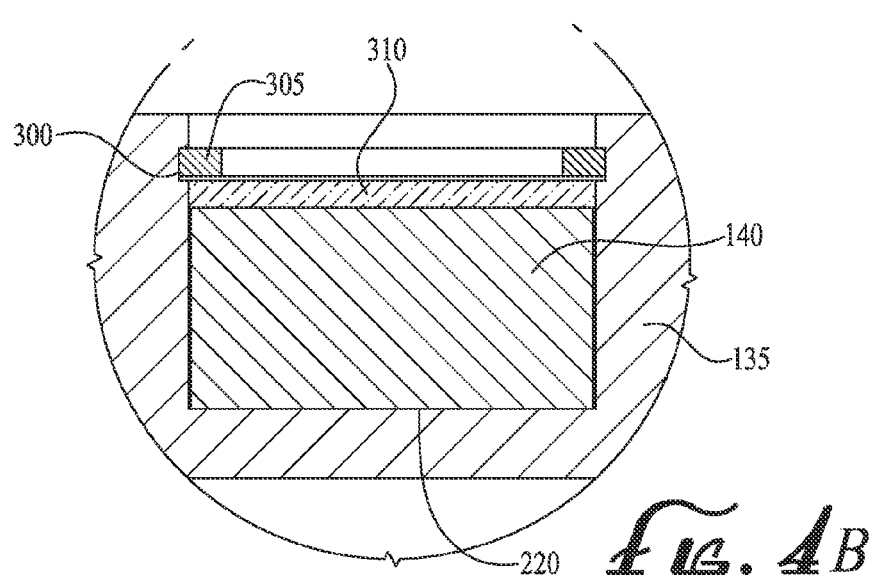

MOTOR BEARING FOR ELECTRIC SUBMERSIBLE MOTORS

CROSS REFERENCE TO RELATED APPLICATIONS

This application claims the benefit of U.S. Provisional Application No. 62/005,520 to Parmeter et al., filed May 30, 2014 and entitled "MAGNETIC ANTI-ROTATION MOTOR BEARING," which is hereby incorporated by reference in its entirety.

BACKGROUND OF THE INVENTION

1. Field of the Invention

Embodiments of the invention described herein pertain to the field of submersible pump motors. More particularly, but not by way of limitation, one or more embodiments of the invention enable a motor bearing for electric submersible motors.

2. Description of the Related Art

Electric motors convert electrical energy into mechanical energy to produce linear force or torque and are used in many applications requiring mechanical power, such as pumps. In the case of an electric submersible pump (ESP), a multi-phase electric motor is typically used in conjunction with a centrifugal pump to lift fluid, such as oil or water, to the surface of a well. In particular, an ESP motor is typically a two-pole, three-phase, squirrel cage induction motor. The two-pole design conventionally runs at 3600 rpm synchronous speed at 60 Hz power. These electric motors include a stationary component known as a stator, and a rotating component known as the motor shaft. In ESP applications, the stator is energized by a power source located at the well surface and connected to the stator with an electric cable. The electricity flowing through the stator windings generates a magnetic field, and the motor shaft rotates in response to the magnetic field created in the energized stator. A rotor secured to the shaft rotates within the stator. The length of the wound stator determines the number of rotor sections.

Rotor sections are spaced apart from one another, and a stator bearing is located between each rotor section for maintaining the shaft in axial alignment. The bearings are sometimes interchangeably referred to as "motor bearings", "rotor bearings" or "stator bearings." These stator bearings are non-rotating bearings that fit snuggly inside the stator bore. The rotating shaft has the rotor sections and bearing sleeves keyed to the shaft. The bearing sleeves rotate inside the stator bearings and prevent the rotors from making contact with the stator bore. The motor is filled with high dielectric oil, and the bearings are hydrodynamic. A pressure wedge in a radial direction is generated between the stator bearing and bearing sleeve while the shaft is rotating and no contact between the stator bearing and the bearing sleeve should occur during proper operation.

It is critical that the stator bearings do not rotate against the stator bore or failure will occur. Should the stator bearings rotate against the stator bore, the roughness of the stator laminations will not provide a sufficient hydrodynamic profile, and this will cause severe wear and lead to failure. However, the bearings must be free to move along the shaft in an axial direction due to thermal expansion. Because the motor components are made of varying materials (the rotors are copper, the shaft is steel), they expand at different rates. If the bearings become locked axially in the bore, the motor will fail due to excessive friction as the rotor tries to expand against a locked bearing.

Two conventional approaches to prevent bearing spin (rotation about the central axis of the bearing) have been used in the ESP industry. One conventional method is to fit an elastomeric band inside a groove cut on the outside of the bearing. The band protrudes above the bearing surface enough to prevent the bearing from spinning through the use of friction, and still allows the bearing to move axially along the motor shaft. However, the elastomeric bands soften with high temperatures, particularly those high temperatures experienced in downhole wells, and the elastomeric bands degrade over time. Degradation of the elastomeric bands causes the bearing to undesirably rotate, eventually leading to failure.

Another approach has been to fit keys on the outside of the bearing that fit inside a continuous keyway in the stator. Some keys are welded in place, while others use spring loaded keys. Once the bearings begin to rotate, the keys will pop into the keyway. The problem with keys is that they have very little surface area and are prone to fail due to fatigue from fretting. If the keys fail, the bearing will rotate against the stator bore and eventually cause a failure. In addition, keys have a tendency to pound an indentation in the keyway. The keys are then locked axially into place, which undesirably prevents the bearing from moving in an axial direction.

As is apparent from the above, current approaches to prevent rotation of motor bearings suffer from many shortcomings. Therefore, there is a need for an improved motor bearing for electric submersible motors.

BRIEF SUMMARY OF THE INVENTION

One or more embodiments of the invention enable a motor bearing for an electric submersible motor.

A motor bearing for an electric submersible motor is described. An illustrative embodiment of an electric submersible motor includes a rotatable motor shaft extending longitudinally through a submersible motor, a bearing sleeve secured to the rotatable motor shaft in between two adjacent rotor sections, a motor bearing radially outward from the bearing sleeve and pressed against a stator bore, wherein the motor bearing comprises a series of magnets dispersed around an outer diameter of the motor bearing, and an insulation layer covering a surface of each magnet of the series of magnets, wherein the insulation layer faces the stator bore. In some embodiments, each magnet of the series of magnets is inset into a recession in an axial surface of the motor bearing. In certain embodiments, each magnet of the series of magnets is inset in the recession such that the insulation layer is below the axial surface of the motor bearing. In some embodiments, the insulation layer includes one of a polyimide or PEEK. In certain embodiments, the submersible motor is a squirrel cage induction motor.

A motor bearing of an illustrative embodiment includes a series of recessions dispersed around an outer axial surface of a motor bearing, a magnet inset in each recession of the series of recessions, and an insulation layer coating a surface of each of the magnets. In some embodiments, the insulated surface of each of the magnets faces a stator bore, and the magnets are inset in the series of recessions such that the insulated surface of each of the magnets is below the outer axial surface of the motor bearing. In some embodiments, the motor bearing includes a retaining ring in each recession of the series of recessions, wherein each retaining ring is outward of the insulated surface of each of the magnets. In certain embodiments, there are three recessions in the series of recessions and each recession is spaced at one-hundred-twenty degree intervals. In some embodiments, the motor bearing is one of a squirrel cage induction motor bearing or a permanent magnet motor bearing.

An illustrative embodiment of an electric submersible motor includes a rotatable motor shaft, a stator bore outward of the rotatable motor shaft, a motor bearing pressed into the stator bore, and a plurality of magnets secured around an outer diameter of the motor bearing, wherein each of the plurality of magnets is secured into a recession, wherein the recession is in an axial surface of the motor bearing. In some embodiments, each of the plurality of magnets is set below the axial surface of the motor bearing. In certain embodiments, the electric submersible motor includes an insulation layer at least partially coating each of the plurality of magnets. In some embodiments, the insulation layer faces the stator bore. In certain embodiments, the electric submersible motor includes a sleeve inward of the motor bearing, wherein the sleeve is keyed to the rotatable motor shaft in between two adjacent rotor sections.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

The above and other aspects, features and advantages of illustrative embodiments of the invention will be more apparent from the following more particular description thereof, presented in conjunction with the following drawings wherein:

FIG. 1 is a longitudinal cross section of an electric submersible motor including a motor bearing of an illustrative embodiment.

FIG. 3 is a cross section of a motor bearing of an illustrative embodiment.

FIG. 4A is a cross section cut along line 4A-4A of FIG. 3 of a motor bearing of an illustrative embodiment.

FIG. 4B is an enlarged cross section of area 4B in FIG. 4A of a motor bearing of an illustrative embodiment.

Figure 2B:
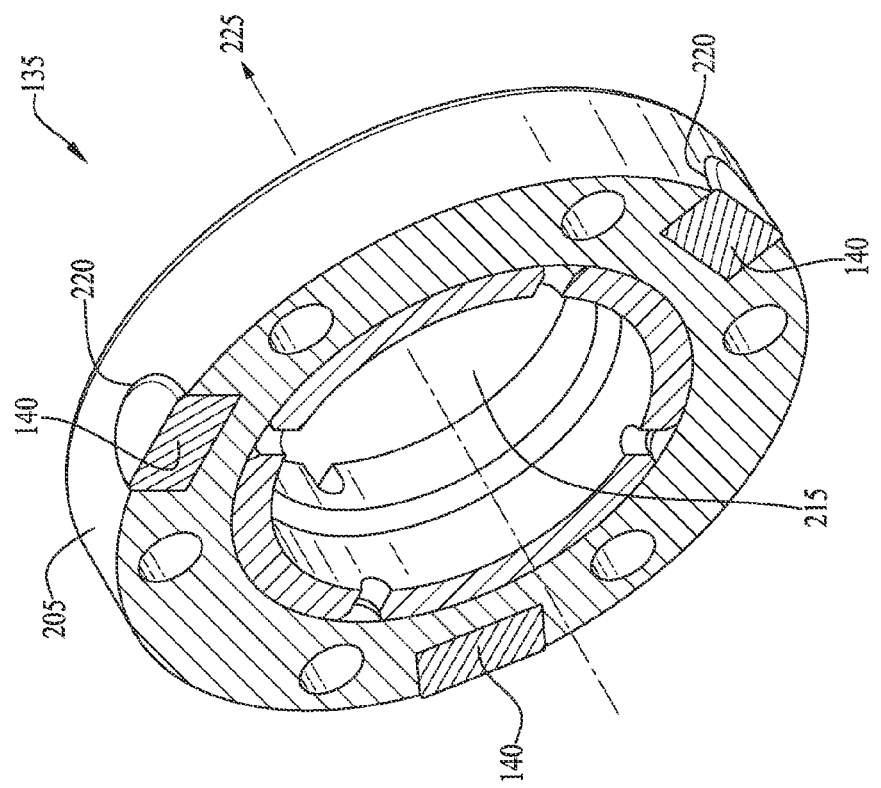
FIG. 2B is a perspective view partly in cross section across line 2B-2B of FIG. 2A of a motor bearing of an illustrative embodiment.

While the invention is susceptible to various modifications and alternative forms, specific embodiments thereof are shown by way of example in the drawings and may herein be described in detail. The drawings may not be to scale. It should be understood, however, that the embodiments described herein and shown in the drawings are not intended to limit the invention to the particular form disclosed, but on the contrary, the intention is to cover all modifications, equivalents and alternatives to such embodiments that fall within the scope of the present invention as defined by the appended claims.

DETAILED DESCRIPTION

A motor bearing for an electric submersible motor will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used in this specification and the appended claims, the singular forms "a", "an" and "the" include plural referents unless the context clearly dictates otherwise. Thus, for example, reference to a magnet includes one or more magnets.

This specification makes use of a cylindrical coordinate system, where the origin is at the center of the motor shaft, and the length of the motor shaft corresponds to the longitudinal axis. As used herein, an "axial" surface of a bearing runs substantially parallel to the longitudinal axis. A radial surface is substantially parallel to the polar axis.

"Coupled" refers to either a direct connection or an indirect connection (e.g., at least one intervening connection) between one or more objects or components. The phrase "directly attached" means a direct connection between objects or components.

As used herein, the term "outer" or "outward" means the radial direction away from the center of the shaft of the ESP motor and/or the aperture of a component through which the motor shaft would run. In the art, "outer diameter" and "outer circumference" are sometimes used equivalently. As used herein, the outer diameter is used to describe what might otherwise be called the outer circumference of a motor component such as a motor bearing.

As used herein, the term "inner' or "inward" means the radial direction towards the center of the shaft of the ESP motor and/or the aperture of a component through which the motor shaft would run. In the art, "inner diameter" and "inner circumference" are sometimes used equivalently. As used herein, the inner diameter is used to describe what might otherwise be called the inner circumference of a pump component, such as a motor bearing.

Illustrative embodiments provide a motor bearing for use in submersible motor applications. While for ease of description and so as not to obscure the invention, illustrative embodiments are described in terms of an oil or gas pumping embodiment, nothing herein is intended to limit the invention to that embodiment. Illustrative embodiments provide a motor bearing of a hydrodynamic bearing set, with magnets dispersed about the outer circumference of the bearing. The magnets may be evenly (uniformly) dispersed and/or inset in recessions in an axial surface of the bearing. In one example, the magnets are inset below the axial surface and facing the stator bore. A surface of the magnets facing the stator bore may be insulated.

After testing of a bearing of illustrative embodiments in a three-phase induction motor, the inventors have observed that contrary to initial expectations, the magnets of illustrative embodiments prevent spinning (rotation) of the motor bearing about its central axis, but advantageously still allow longitudinal movement of the bearing in order to accommodate thermal expansion. The magnets of illustrative embodiments may not cause the bearing to spin in the motor's 60 Hz rotating field as might be expected and may be more effective than conventional methods for preventing bearing rotation. An insulative coating on the magnets of illustrative embodiments may prevent electrical discharge between the motor stator and the magnets.

The motor bearing of illustrative embodiments may be employed in an electric submersible motor, such as three-phase induction squirrel cage motor or permanent magnet motor. An exemplary electric submersible motor is illustrated in FIG. 1. Electric submersible motor 100 may be employed in an electric submersible pump (ESP) assembly and implemented in a downhole well, such as an oil, water and/or gas well. Submersible motor 100 includes motor shaft 105, which runs longitudinally through submersible motor 100. During operation of submersible motor 100, motor shaft 105 rotates either clockwise or counter-clockwise about motor central axis 145. A continuous keyway (not shown) may run the length of motor shaft 105, such that rotor sections 110 may be keyed to motor shaft 105 and rotate with shaft 105. Stator 115 may be made of laminations and rigidly mounted within tubular motor housing 120. Bearing sleeve 125 may be placed between rotor sections 110, with washer 130 separating rotor section 110 and bearing sleeve 125. Bearing sleeve 125 is typically made of bronze and may also be secured to motor shaft 105, for example by key or friction, such that it rotates with motor shaft 105.

Motor bearing 135 may be placed radially outwards and/or concentrically around bearing sleeve 125 and pressed against stator bore 150 (the inner wall of stator 115). Motor bearing 135 is stationary in that should not substantially rotate with shaft 105 during operation of submersible motor 100, whilst bearing sleeve 125 rotates within motor bearing 135. Motor bearing 135 and bearing sleeve 125 may be hydrodynamic bearings making up a bearing set, and producing a pressure profile in a radial direction inside motor bearing 135 and bearing sleeve 125 when the motor is in operation. Motor bearing 135 may include a series of magnets 140 on an outer circumference, for example placed around an outer axial surface of motor bearing 135, which magnets may substantially prevent rotation of motor bearing 135 about motor central axis 145 in stator bore 150. At the bottom of motor shaft 105, a large snap ring (not shown) may be used to support rotor sections 110.

Figure 2A:
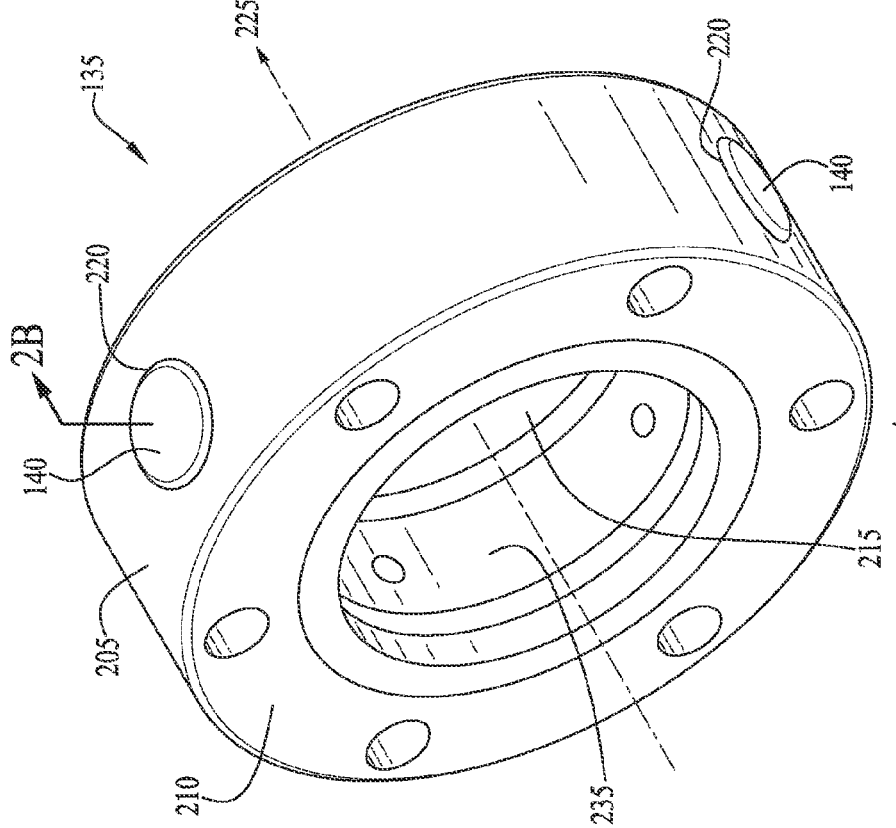
FIG. 2A is a perspective view of a motor bearing of an illustrative embodiment.

FIGS. 2A-4B illustrate a motor bearing of illustrative embodiments. As illustrated in FIGS. 2A and 2B, motor bearing 135, which may for example be made of steel, may be disc-like and/or cylindrical in shape with a central cavity 215 through which motor shaft 105 and bearing sleeve 125 may run. As may be best illustrated in FIG. 2A, motor bearing 135 includes two radial surfaces 210 and two axial (longitudinal) surfaces. Inner axial surface 235 is on an inner diameter of motor bearing 135 and may face bearing sleeve 125. Outer axial surface 205, may be on an outer diameter of motor bearing 135. Outer axial surface 205 may be pressed tightly against stator bore 150 when motor bearing 135 is installed in submersible motor 100.

Recessions 220 may be drilled, braised or molded into motor bearing 135 around one of outer axial surface 205, radial surface 210 or a combination thereof, and magnets 140 may be secured in each recession 220. In some embodiments, for example as shown in FIG. 2A, recessions 220 may be placed around outer axial surface 205, but not radial surfaces 210. Radial surfaces 210 of motor bearing 135 may face spinning rotor sections 110 when motor bearing 135 is placed in submersible motor 100. Including recessions 220 and/or magnets 140 only around outer axial surface 205 may prevent motor bearing 135 from undesirably picking up torque from the spinning rotor sections 110. In certain embodiments, recessions 220 may be proximate and/or on the outer diameter (outer circumference) of one or both of radial surfaces 210 of motor bearing 135 and/or may be on outer axial surface 205.

As shown in FIG. 2B, recessions 220 may be flat-bottomed holes or notches and/or inset within the outer circumference of motor bearing 135, for example below outer axial surface 205. In another example, recessions 220 may be located at a corner where a radial surface 210 and an outer axial surface 205 meet, such that magnet 140 is exposed on both radial surface 210 and outer axial surface 205. As shown in FIGS. 2A and 2B, recessions 220 with inserted, inlaid and/or inset magnets 140 are placed around the middle of axial surface 210, about halfway between the two radial surfaces 210, such that the outward-facing surface of magnets 140 may face stator bore 150 when motor bearing 135 is included in submersible motor 100 of illustrative embodiments.

As illustrated in FIGS. 4A and 4B, magnets 140 may be attached, placed and/or secured in each recession 220, for example by an interference fit. In some embodiments, magnets 140 may be held in place due to the magnetic steel material of motor bearing 135 and/or the magnetic field generated by submersible motor 100 without the need for any other securing mechanism. In certain embodiments, the magnets may be press fit, epoxied, glued, screwed, secured by snap ring or otherwise secured in place. When inserted in recessions 220, magnets 140 may inlaid and/or inset into a surface of motor bearing 135, for example outer axial surface 205, with at least one surface of magnet 140 facing stator bore 150. In one example, an outer surface of magnet 140 may be inset into outer axial surface 205 of motor bearing 135, and facing stator bore 150.

As illustrated in FIG. 4B, a retaining ring may be employed to secure magnet 140 and/or insulator 310 in place in recession 220. Groove 300 may be formed at, near and/or just below the top of each recession 220 near the surface of bearing 135, and extend circumferentially around the inside of recession 220. Retaining ring 305 may be set into each groove 300 to retain magnets 140 within recessions 220. Retaining ring 305 may be a snap ring or press fit locking star ring and/or made of non-magnetic stainless steel such as 300 series stainless steel, nickel-copper alloy, an austenite nickel-chromium based superalloy or other similar material. Use of super glue, retaining ring 305 or another adhesive mechanism may assist in keeping magnets 140 from being pulled out of place despite contact and/or close proximity with stator bore 150, which stator bore 150 may have high magnetic strength.

One or more magnets 140 may be placed in one, some or all recession 220, filling or substantially filling recession 220. Once inserted, magnets 140 may be slightly shorter than the corresponding recession such that they are inset below the surface of bearing 135, for example as illustrated in FIG. 4B where magnet 140 is shown inset below outer axial surface 205. Placement of magnet 140 below, lower and/or inward of motor bearing 135 surface may prevent insulator 310 on magnet 140 from making contact with stator bore 150. The lowered positioning of insulator 310 may protect insulator 310 from damage. In another example, magnets 140 and/or insulator 310 may be substantially flush (level or even) with outer axial surface 205 and/or radial surface 210.

Magnets 140 may be rare-earth magnets and dispersed about an outer circumference of bearing 135, for example around outer axial surface 205 and/or one or more radial surfaces 210 of motor bearing 135. FIG. 3 illustrates an exemplary arrangement of magnets 140 about outer circumference of bearing 135. As shown in FIG. 3, three magnets 140 are set into three recessions 220 and are evenly spaced at one-hundred-twenty degree intervals proximate outer axial surface 205. An arrangement of three magnets evenly dispersed (spaced) about an outer circumference of motor bearing 135, and set one-hundred-twenty degrees from one another, may assist in centering bearing 135 of illustrative embodiments in stator bore 150. In some embodiments, magnets 140 may alternate, be offset or dispersed between radial surfaces 210 and/or outer axial surface 205.

Magnets 140 may create an attractive force between motor bearing 135 and stator bore 150, preventing motor bearing 135 from rotating about bearing central axis 225 with respect to bore 150 (inner wall) of stator 115. The number and arrangement of magnets 140 may depend on the shape and size of bearing 135. An odd number of magnet-filled recessions, for example three or five magnets 140, evenly dispersed about an outer circumference of motor bearing 135 may center bearing 135 in the stator bore 150. Magnets 140 may be placed around and/or inset into a radial surface of bearing 135, an axial surface, or both, and may be arranged such that they are circumferentially dispersed and have at least one insulated surface exposed to stator bore 150. While magnets 140 may assist in preventing rotation of bearing 135 about bearing central axis 225, magnets 140 advantageously may allow bearing 135 to move axially in order to accommodate thermal expansion.

The strength of magnets 140 may be selected such that magnets 140 have more holding force then the friction produced from oil shear inside rotating bearing sleeve 125, which bearing sleeve 125 may be made of bronze. On average, the magnetic side pull on rotor section 110 of submersible motor 100 of illustrative embodiments is 450 pounds of force. The coefficient of sliding friction for steel on bronze with oil is 0.05. Therefore, the friction force at each motor bearing 135 of an illustrative embodiment is about 22.5 pounds, and magnets 140 should provide a magnetic force stronger than the friction force at each bearing. In one example, a combination of three 17 pounds-force magnets, dispersed about the outer diameter, for example outer axial surface 205, of motor bearing 135 provides an adequate amount of magnetic force to prevent motor bearing 135 from rotating. When the motor oil between motor bearing 135 and bearing sleeve 125 is cold, the oil shear is very high. The force produced by magnets 140 may prevent bearing spin during cold starts of submersible motor 100. In addition to preventing spin, thrust washer 130 between bearing sleeve 125 and rotor section 110 may not be overloaded despite thermal expansion of the bearing assembly, since motor bearing 135 is able to move in an axial direction.

One problem associated with placing magnets into a magnetic field, such as the field present in submersible motor 100, is arcing. Arcing is an undesirable electrical discharge that may occur between stator 115 and magnets 140. Because a high dielectric oil is used in submersible motor 100, the potential energy may build to about 10 volts, for example. Arcing between magnets 140 and stator bore 150 may pit the surfaces of those components. Over time, pitting may cause severe damage to submersible motor 100.

In order to combat arcing between the stator 115 core and magnets 140, insulator 310 (shown in FIG. 4B) may be employed to insulate magnets 140 with a material that suppresses arcing but does not interfere with the magnetism of magnets 140. Suitable materials for insulator 310 may include organic polymer thermoplastic insulation, such as PEEK (polyetheretherketone), polyimide film such as Kapton® (a trademark of E. I. Du Pont De Nemours and Company), or another insulating material that does not substantially interfere with magnetic fields and may be adhered to magnets 140. Insulator 310 may coat and/or cover magnets 140, be extruded onto magnets 140, be in the form of a tape and/or may be layered on the outer surface of magnets 140 in a similar fashion to the insulation coating of magnet wire. Magnets 140 maybe entirely coated, or only the outer surface and/or top face of each magnet 140 exposed to stator bore 150, rotor sections 110 and/or not otherwise covered by bearing 135 may be coated and/or covered by insulator 310.

Testing of a motor bearing 135 as illustrated in FIG. 3 has been conducted in a three-phase induction motor, an illustrative embodiment of submersible motor 100. To test an illustrative embodiment of motor bearing 135 having three PEEK-coated magnets spaced at one-hundred-twenty degree intervals, bearing 135 was placed in submersible motor 100 and the alignment of motor bearing 135 was marked. Prior to testing, the inventors were concerned that the motor's 60 Hz rotating magnetic field would interact with magnets 140, causing motor bearing 135 to rotate, rather than prevent bearing 135 from spinning. However, during operation of submersible motor 100, stationary motor bearing 135 did not rotate and instead was held firmly in place in its initial marked alignment by magnets 140 contrary to initial expectations. In addition, magnets 140 allowed movement of motor bearing 135 in an axial direction during thermal expansion, preventing overload of thrust washer 130. Further, no arcing was observed. An infrared temperature sensor also monitored the motor bearing 135 temperature during testing. The temperature of bearing 135 did not rise any more than the temperature of stator bore 150.

Illustrative embodiments of a motor bearing for electric submersible motors have been described. The magnets of illustrative embodiments may prevent a motor bearing of illustrative embodiments from rotating in stator bore 150, whilst still allowing axial movement of the bearing. Insulation of illustrative embodiments may prevent undesirable arcing.

While the invention herein disclosed has been described by means of specific embodiments and applications thereof, numerous modifications and variations could be made thereto by those skilled in the art without departing from the scope of the invention set forth in the claims. The embodiments described above are therefore considered in all respects to be illustrative and not restrictive. The scope of the invention is indicated by the appended claims, and all changes that come within the scope and range of equivalents thereof are intended to be embraced therein.

What is claimed is:

1. An electric submersible motor comprising:
   a rotatable motor shaft extending longitudinally through a submersible motor;
   a bearing sleeve secured to the rotatable motor shaft in between two adjacent rotor sections;
   a motor bearing radially outward from the bearing sleeve and pressed against a stator bore, wherein the motor bearing comprises a series of magnets dispersed around an outer diameter of the motor bearing;
   an insulation layer covering a surface of each magnet of the series of magnets, wherein the insulation layer faces the stator bore;
   each magnet of the series of magnets inset into a recession in an axial surface of the motor bearing; and
   wherein each magnet of the series of magnets is inset in the recession such that the insulation layer is below the axial surface of the motor bearing.

2. The electric submersible motor of claim 1, wherein the insulation layer comprises one of polyimide or PEEK.

3. The electric submersible motor of claim 1, wherein the series of magnets are evenly dispersed around the outer circumference of the bearing.

4. The electric submersible motor of claim 1, wherein the magnets comprise rare-earth magnets.

5. The electric submersible motor of claim 1, wherein the submersible motor is a squirrel cage induction motor.

6. A motor bearing comprising:
a series of recessions dispersed around an outer axial surface of a motor bearing;
a magnet inset in each recession of the series of recessions;
an insulation layer coating a surface of each of the magnets, wherein the insulated surface of each of the magnets faces a stator bore;
the magnets inset in the series of recessions such that the insulated surface of each of the magnets is below the outer axial surface of the motor bearing; and
retaining ring in each recession of the series of recessions, wherein each retaining ring is outward of the insulated surface of each of the magnets.

7. The motor bearing of claim 6, wherein there are three recessions in the series of recessions and each recession is spaced at one-hundred-twenty degree intervals.

8. The motor bearing of claim 6, wherein each recession in the series of recessions are evenly dispersed around the outer axial surface of the bearing.

9. The motor bearing of claim 6, wherein the motor bearing is a squirrel cage induction motor bearing.

10. The motor bearing of claim 6, wherein the motor bearing is a permanent magnet motor bearing.

11. The motor bearing of claim 6, wherein each magnet is secured at least partially by press fit.

12. The motor bearing of claim 6, wherein each magnet is a rare-earth magnet.

13. An electric submersible motor comprising:
a rotatable motor shaft;
a stator bore outward of the rotatable motor shaft;
a motor bearing pressed into the stator bore; and
a plurality of magnets secured around an outer diameter of the motor bearing, wherein each of the plurality of magnets is secured into a recession, wherein the recession is in an axial surface of the motor bearing; and
a retaining ring proximate to a top of each of the recessions.

14. The electric submersible motor of claim 13, wherein each of the plurality of magnets is set below the axial surface of the motor bearing.

15. The electric submersible motor of claim 13, further comprising an insulation layer at least partially coating each of the plurality of magnets.

16. The electric submersible motor of claim 15, wherein the insulation layer is one of polyimide film or PEEK.

17. The electric submersible motor of claim 15, wherein the insulation layer faces the stator bore.

18. The electric submersible motor of claim 13, further comprising a sleeve inward of the motor bearing, wherein the sleeve is keyed to the rotatable motor shaft in between two adjacent rotor sections.

19. The electric submersible motor of claim 13, wherein the plurality of magnets are dispersed circumferentially about one of a radial surface of the motor bearing, an axial surface of the motor bearing, or a combination thereof.

* * * * *